United States Patent

Imataki

[11] Patent Number: 5,806,388
[45] Date of Patent: Sep. 15, 1998

[54] PROCESS FOR MANUFACTURING OPTICAL RECORDING MEDIUM

[75] Inventor: Hiroyuki Imataki, Yokohama, Japan

[73] Assignee: Canon Kabushiki Kaisha, Tokyo, Japan

[21] Appl. No.: 795,727

[22] Filed: Feb. 4, 1997

Related U.S. Application Data

[63] Continuation of Ser. No. 246,719, May 20, 1994, abandoned.

[30] Foreign Application Priority Data

Jun. 4, 1993 [JP] Japan .................................. 5-158108

[51] Int. Cl.⁶ ........................................................ B26D 1/00
[52] U.S. Cl. ........................................................ 83/13; 83/15
[58] Field of Search ................................ 83/13, 14, 15, 83/663, 669, 861, 862

[56] References Cited

U.S. PATENT DOCUMENTS

| | | | |
|---|---|---|---|
| 4,606,250 | 8/1986 | Krosbacher et al. | 83/161 |
| 4,925,733 | 5/1990 | Imataki et al. | 428/336 |
| 4,954,379 | 9/1990 | Nishida et al. | 428/64 |
| 4,956,215 | 9/1990 | Fujita et al. | 428/64 |
| 4,964,934 | 10/1990 | Gregg | 428/64 X |
| 5,002,622 | 3/1991 | Gregg et al. | 156/209 |
| 5,026,623 | 6/1991 | Imataki et al. | 430/270 |
| 5,058,925 | 10/1991 | Hiraoka et al. | 428/215 |
| 5,075,060 | 12/1991 | Imataki | 264/167 |
| 5,077,725 | 12/1991 | Nakayama et al. | 369/275.3 |
| 5,085,925 | 2/1992 | Hiraoka et al. | 428/215 |
| 5,158,859 | 10/1992 | Imataka et al. | 430/271 |
| 5,160,572 | 11/1992 | Nakayama et al. | 156/510 |
| 5,173,391 | 12/1992 | Hiraoka et al. | 430/200 |
| 5,174,937 | 12/1992 | Tamura et al. | 264/106 |
| 5,216,665 | 6/1993 | Imataki | 369/279 |
| 5,249,176 | 9/1993 | Imataki | 369/283 |
| 5,344,304 | 9/1994 | Tamura et al. | 425/195 |

FOREIGN PATENT DOCUMENTS

| | | |
|---|---|---|
| 0251794 | 1/1988 | European Pat. Off. . |
| 0494479 | 7/1992 | European Pat. Off. . |
| 088154 | 4/1987 | Japan .................................. 428/64 |
| 62-88154 | 4/1987 | Japan . |
| 2010537 | 1/1990 | Japan . |
| 2031344 | 2/1990 | Japan . |
| 3185642 | 8/1991 | Japan . |

*Primary Examiner*—Maurina T. Rachuba
*Attorney, Agent, or Firm*—Fitzpatrick, Cella, Harper & Scinto

[57] ABSTRACT

A process for manufacturing an optical recording medium having in order, a substrate, a recording film and a protective substrate and having a predetermined size, in which the protective substrate is stacked on the substrate using an adhesive layer at least outside a recording area of the recording film. The process comprises a step for cutting out an optical recording medium of a predetermined size, by using a cutting edge, from the optical recording medium of a work size, which is larger than the predetermined size. The work-sized optical recording medium comprises a substrate having the recording film on its surface, a work-sized protective substrate provided on the work-sized substrate using an adhesive layer at least in an area outside of a recording area, including an outside area of the predetermined size. The cutting step is performed in such a way that the adhesive layer, positioned at least inside a position where a cutting edge is made to enter the work-sized optical recording medium, is substantially not deformed. Thus, it is possible to provide a process of manufacturing a high-quality optical recording medium at a low cost.

31 Claims, 7 Drawing Sheets

PROCESS FOR MANUFACTURING OPTICAL RECORDING MEDIUM

This application is a continuation of application Ser. No. 08/246,719, filed May 20, 1994, now abandoned.

BACKGROUND OF THE INVENTION

1. Field of the Invention

The present invention relates to a process for manufacturing an optical recording medium and, more particularly, to a process for manufacturing a high-quality optical recording medium.

2. Description of the Related Art

Figures 2A, 2B:
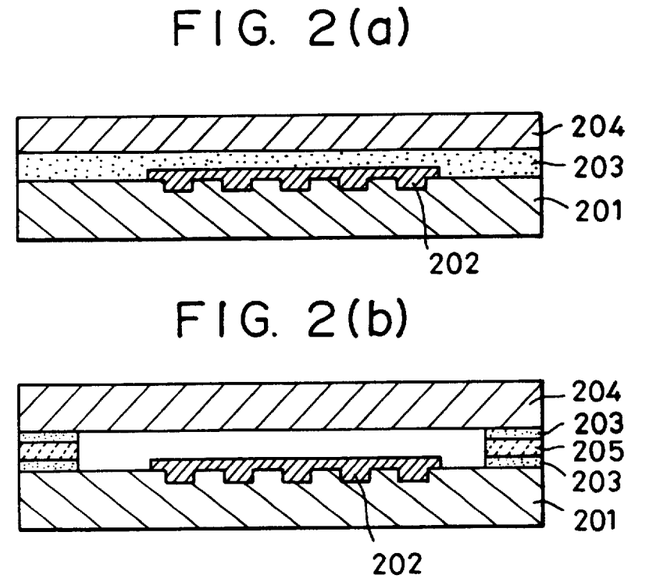
FIG. 2(a) is a schematic sectional view of an optical recording medium having a hermetically sealed structure.
FIG. 2(b) is a schematic sectional view of an optical recording medium having an air gap structure.

As shown in FIGS. 2(a) and 2(b), an optical recording medium is known to have a structure in which a recording film 202 is formed on a substrate 201 having a preformat on the surface thereof and a protective substrate 204 is provided on the recording film using an adhesive layer 203, or in which a spacer 205 is mounted in the inner and outer peripheries of a substrate by using an adhesive agent and a protective substrate is provided through the spacer.

The following are examples of a process for manufacturing such an optical recording medium:

(1) A process in which a substrate is molded into a predetermined size of an optical recording medium by injection molding or the like, and a recording film or the like is formed on the substrate, after which a protective substrate molded into the predetermined size is provided on the recording film, thus forming an optical recording medium, and (2) A process in which a substrate having a size of larger than a predetermined size of the optical recording medium (hereinafter referred to as work-sized) is prepared, and a recording film or the like is formed on the substrate, after which the work-sized protective substrate is provided on the recording film to form a work-sized optical recording medium. Thereafter, the work-sized optical recording medium is cut to form an optical recording medium having a predetermined size.

The above method (2) is preferable in that handling in manufacturing steps is easy.

As a process for cutting out an optical recording medium of a predetermined size from a work-sized optical recording medium, a cutting edge or a laser beam, a router and the like have been proposed for cutting. When a time for cutting and a cost for cutting apparatus are taken into consideration, the cutting method using a cutting edge is preferable to reduce the cost of the optical recording medium.

Figure 3:
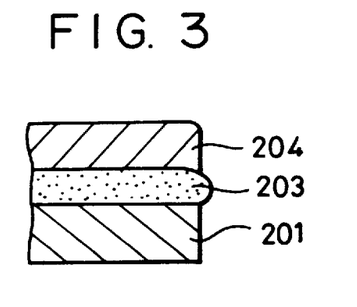
FIG. 3 is an illustration of a squeeze out of an adhesive agent from the end surface of the optical recording medium.

However, cutting using a cutting edge has the problem that an adhesive agent squeezes out in the cut end portion of the optical recording medium, as shown in FIG. 3. This tendency is conspicuous when a thermoplastic adhesive agent is used as an adhesive agent. Further, the squeeze out of the adhesive agent is particularly conspicuous when a cut portion is heated before cutting in order to prevent a substrate from being cracked during cutting.

Such a squeeze out of an adhesive agent becomes problematical from the point of view of the appearance of an optical recording medium. In addition, the bonding force between the substrate and the protective substrate, or the substrate and the spacer in the outer peripheral portion of the optical recording medium decreases, causing the members to become separated. Thus, the optical recording medium may be destroyed or the recording film may deteriorate when steps are taken to improve the resistance to the environment of the recording layer through the use of an adhesive layer.

In the case of an optical card in which information is recorded and reproduced by the linear reciprocating movement of the optical recording medium, the parallel degree between one side of the optical card and recording tracks is very important for the recording/reproducing accuracy. Therefore, such a squeeze out of an adhesive agent is a major technological problem when an optical recording medium of a work size is cut by using a cutting edge.

SUMMARY OF THE INVENTION

The present invention has been achieved in view of the above-described problems of the prior art. It is an object of present invention to provide an optical recording medium manufacturing process which is capable of manufacturing a high-quality optical recording medium at a low cost.

The inventors of the present invention conducted extensive research on such an objective and found that the squeeze out of an adhesive agent at the end surface of an optical recording medium can be effectively suppressed when a work-sized optical recording medium is cut in such a way that an adhesive layer positioned at least inside a position where a cutting edge is made to enter the work-sized optical recording medium is not deformed. Thus, the present invention has been achieved.

According to one aspect of the present invention, there is provided a process for manufacturing an optical recording medium having in order a substrate, a recording film and a protective substrate and having a predetermined size, in which the protective substrate is stacked on the substrate using an adhesive layer at least outside a recording area of the recording film. The process comprises a step for cutting out by using a cutting edge an optical recording medium of a predetermined size from the optical recording medium of the work size which is larger than the predetermined size, said work-sized optical recording medium comprising a work-sized substrate having the recording film provided on its surface, a work-sized protective substrate provided on the work-sized substrate using an adhesive layer at least in an area outside a recording area including an area outside the predetermined size, wherein the cutting step is performed in such a way that an adhesive layer positioned at least inside a position where a cutting edge is made to enter the work-sized optical recording medium is substantially not deformed.

According to another aspect of the present invention, there is provided a process for manufacturing an optical recording medium having in order a substrate, a recording film and a protective substrate, and having a predetermined size, in which the protective substrate is stacked on the substrate using an adhesive layer at least outside the recording area of the recording film. The process comprises a step for cutting out the predetermined-sized optical recording medium by using a cutting edge from an optical recording medium having a work size larger than the predetermined size with said work-sized optical recording medium comprising a work-sized substrate having the recording film provided on its surface, a work-sized protective substrate provided on the work-sized substrate using an adhesive layer at least in an outside area of the recording area, including an outside area of the predetermined size, wherein solid particles are contained in the adhesive layer positioned at least inside and outside of a position where a cutting edge is made to enter the optical recording medium.

According to the present invention, when an optical recording medium of a predetermined size is cut out from an optical recording medium of a work size by using a cutting edge, it is possible to prevent a squeeze out of an adhesive layer, a decrease in the bonding strength in the end surface of the optical recording medium, and aging deterioration of a recording film. Thus, it is possible to manufacture a high-quality optical recording medium at a low cost.

The above and further objects, aspects and novel features of the invention will more fully appear from the following detailed description when the same is read in connection with the accompanying drawings. It is to be expressly understood, however, that the drawings are for the purpose of illustration only and are not intended to limit the invention.

DETAILED DESCRIPTION OF THE PREFERRED EMBODIMENTS

Examples of the present invention will be explained below in detail with reference to the accompanying drawings.

Figure 1A:
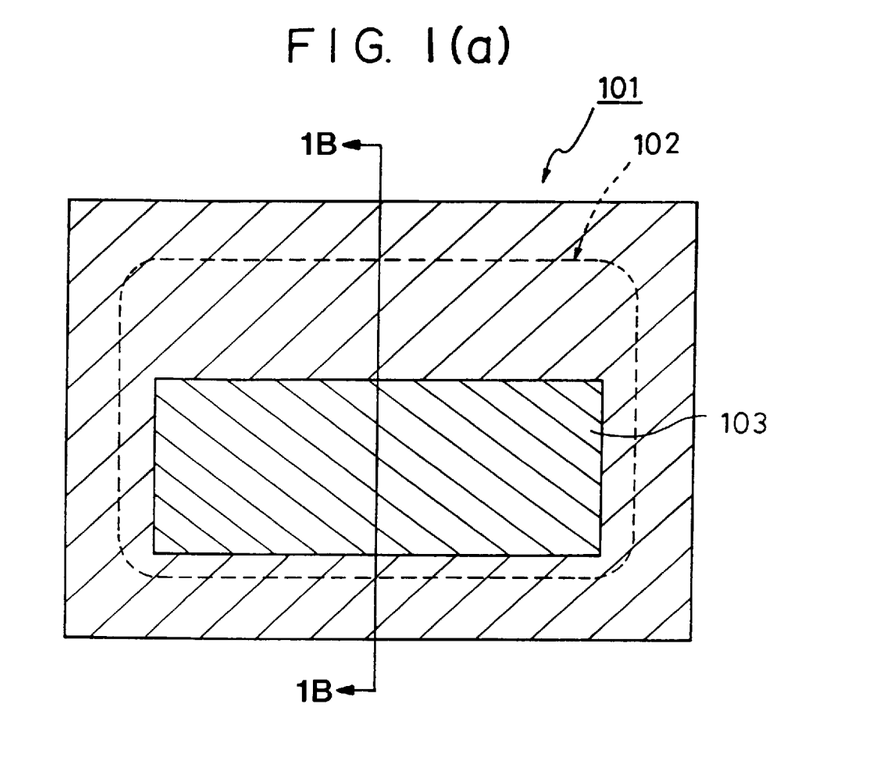
FIG. 1(a) is a schematic plan view of an embodiment of an optical card in accordance with the present invention.
Figure 1B:
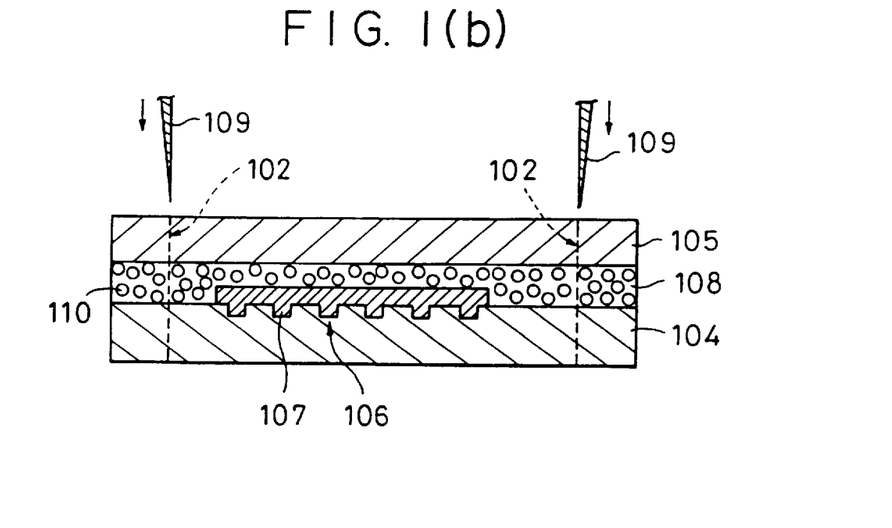
FIG. 1(b) is a slightly reduced schematic sectional view of the optical card taken along the line 1B—1B of FIG. 1(a)

FIGS. 1(a) and 1(b) are schematic illustrations of a process for manufacturing an optical recording medium in accordance with the present invention. FIG. 1(a) is a schematic plan view of an optical card of a work size; and FIG. 1(b) is a slightly reduced schematic sectional view of the optical card taken along the line 1B—1B of FIG. 1(a).

In FIG. 1(a), reference numeral 101 denotes a work-sized optical card; reference numeral 102 denotes a broken line indicating a predetermined size of the optical card; reference numeral 103 denotes an area of the optical card, in which information is to be recorded or information has been recorded. In FIG. 1(b), reference numeral 104 denotes a substrate of a work size; reference numeral 105 denotes a protective substrate of a work size; reference numeral 106 denotes a track groove, formed on the surface of the substrate, nearly parallel to one side along the length of the optical card of a predetermined size; reference numeral 107 denotes a recording layer; and reference numeral 108 denotes an adhesive layer. As shown in FIG. 1(b), a cutting edge 109 is brought into contact with a position 102 of the predetermined size of the optical card 101, and is made to enter along the thickness of the optical card in order to cut out an optical card of a predetermined size from a work-sized optical card. Thus, it is possible to manufacture an optical card of a predetermined size.

In the cutting step of the present invention, cutting the adhesive layer 108 at least inside the position 102 (hereinafter abbreviated as a cutting position) where the cutting edge 109 is made to enter the work-sized optical card without causing the adhesive layer to be compressed or deformed as the cutting edge enters the optical card is a preferable process because a squeeze out of the adhesive layer from the end surface of the optical card can be effectively prevented. The "inside" in the present invention means the recording area side of the optical card from the cutting position.

Figure 4:
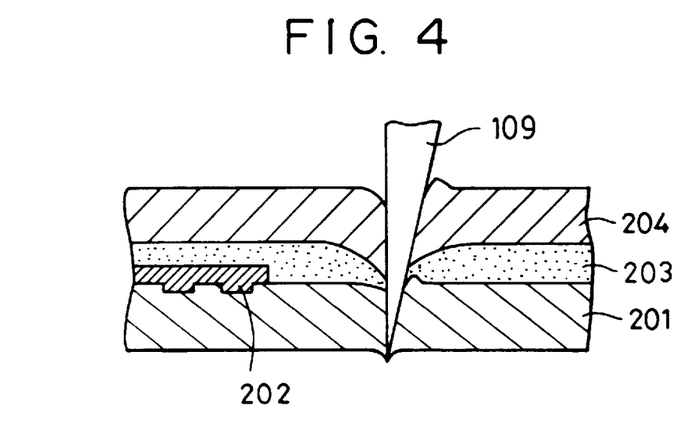
FIG. 4 is an illustration of a conventional cutting method using a cutting edge.

The reason is not clear why the squeeze out of the adhesive layer can be prevented when a predetermined-sized optical card is cut out from a work-sized optical card without causing the adhesive layer 108 to be compressed or deformed. However, it is considered that, when an adhesive layer 203 is compressed and deformed because a cutting edge 109 (shown also in FIG. 5) enters it as shown in FIG. 4, an adhesive agent which forms the adhesive layer 203 moves inwardly, the internal pressure of the adhesive layer 203 increases, and when the cutting edge is pulled out after cutting has terminated, the adhesive agent moves in a direction in which the internal pressure is released to squeeze out the adhesive layer. When the adhesive layer 203 is not substantially deformed as described in the cutting step, an increase in the internal pressure of the adhesive layer can be suppressed. As a result, it is possible to effectively prevent the squeeze out of the adhesive layer.

In the cutting step, it is preferable that the work-sized optical card be cut without causing the adhesive layer 108, positioned inside and outside from the cutting position of the work-sized optical card, to be substantially deformed, because the adhesive layer 108 can be prevented from squeezing out from the end surface of the predetermined recording medium more completely and cutting accuracy can be further improved.

The phrase of "adhesive layer 108 is not substantially deformed" means that, for example, the thickness of the adhesive layer 108 after cutting does not become 70% or less of the adhesive layer's thickness before cutting and, more particularly, does not become 80% or less that of the adhesive layer before cutting, even at the end surface.

In the present invention, an example of a means for preventing the compression and deformation of the adhesive layer 108 is a method in which solid particles 110 are contained in the adhesive layer 108, as shown in FIG. 1(b). Solid particles formed of: ceramics such as $SiO_2$, SiO, SiNx, or $Al_2O$; metals such as iron, copper, nickel, or silver; and acrylic resins such as polystyrene, polypropylene, or polymethyl methacrylate may be appropriately selected and used.

The particle size of these solid particles is from 0.1 to 100 μm, preferably from 0.5 to 50 μm, and more preferably from 30 to 50 μm, though the size depends upon the thickness of the adhesive layer 108, in order to effectively prevent the compression and deformation of the adhesive layer during cutting.

The content of these solid particles within the adhesive layer is not particularly limited if the deformation of the adhesive layer can be prevented in the cutting step, however, a preferable range thereof is from 20 to 70% by volume and, particularly, from 40 to 60% because the bonding force of the adhesive layer 108 is not decreased. Examples of the solid particles capable of preventing the adhesive layer 108 from being deformed in the above range of the volume percentage within the adhesive layer include: metals having an average particle size of 30 to 50 μm, ceramics having an average particle size of 40 to 50 μm, and so on.

Examples of the adhesive agent used for the adhesive layer 108 include: conventional adhesive agents, for example, thermoplastic adhesive agents, such as polymers and copolymers of vinyl monomers such as vinyl acetate, acrylic ester, methacrylate ester, vinyl chloride, ethylene, acrylic acid, methacrylic acid, or acrylamide, polyamide, polyester, or epoxy; adhesive agents, such as amino resin (urea resin, melamine resin), phenol resin, epoxy resin, urethane resin, or thermoplastic vinyl resin; and rubber-based adhesive agents such as natural rubber, nitrile rubber, chloro rubber, or silicon rubber.

According to the present invention, it is possible to effectively prevent the adhesive layer from squeezing out even when a thermoplastic adhesive agent such that the adhesive layer is likely to squeeze out is used during cutting although the recording sensitivity of the recording layer is not particularly deteriorated.

Figure 6A:
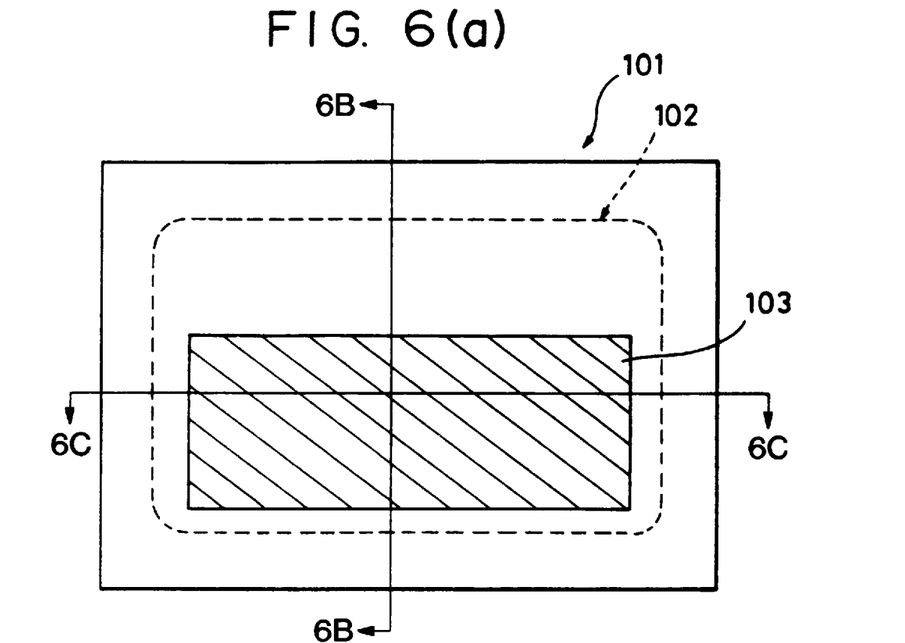
FIG. 6(a) is a schematic plan view of another embodiment of an optical card in accordance with the present invention.
Figure 6B:
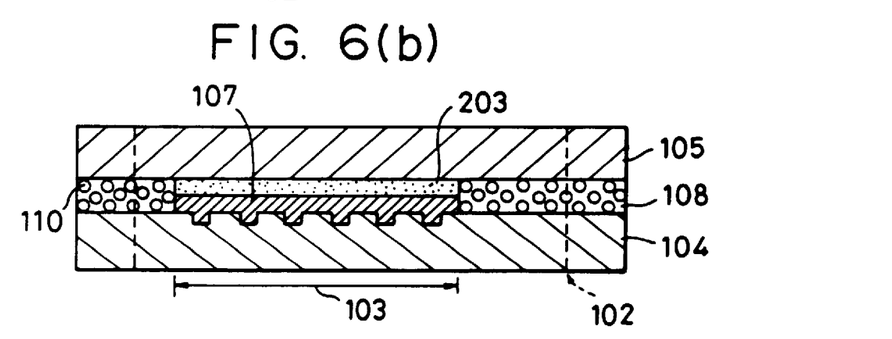
FIG. 6(b) is a slightly enlarged schematic sectional view of the optical card taken along the line 6B—6B of FIG. 6(a)
Figure 6C:
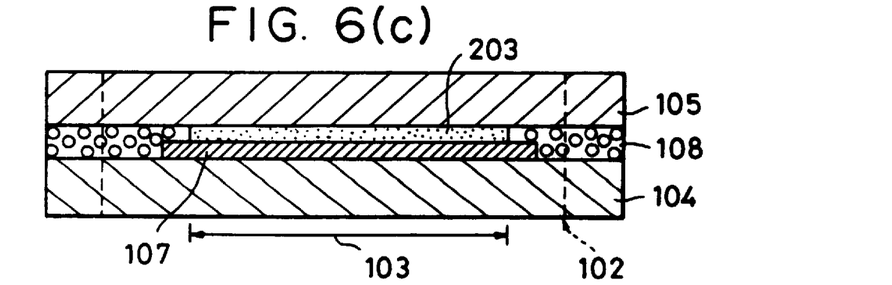
FIG. 6(c) is a slightly reduced schematic sectional view of the optical card taken along the line 6C—6C of FIG. 6(a)
Figure 7A:
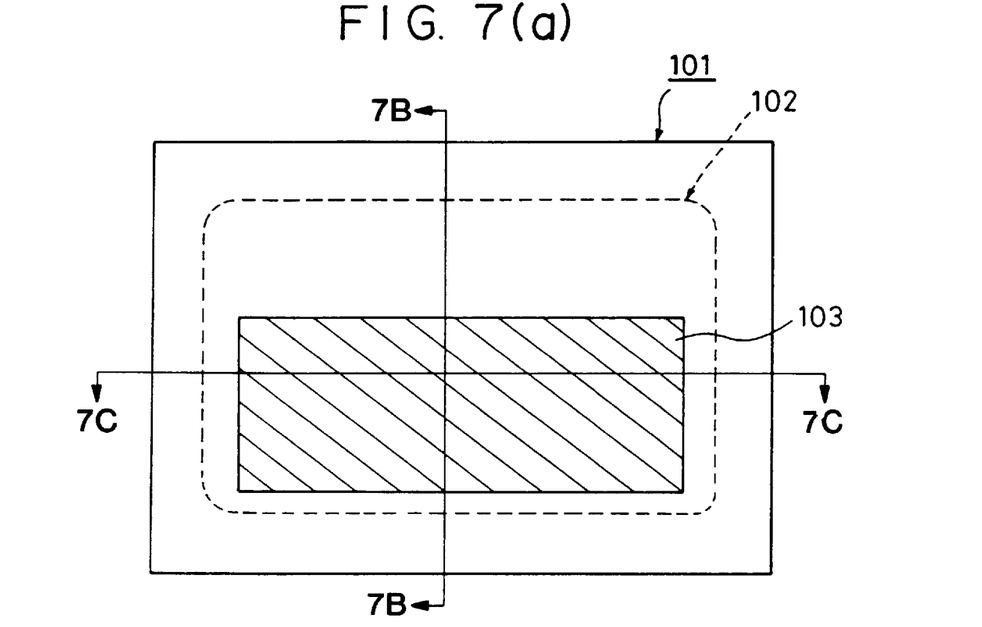
FIG. 7(a) is a schematic plan view of still another embodiment of an optical card in accordance with the present invention.
Figure 7B:
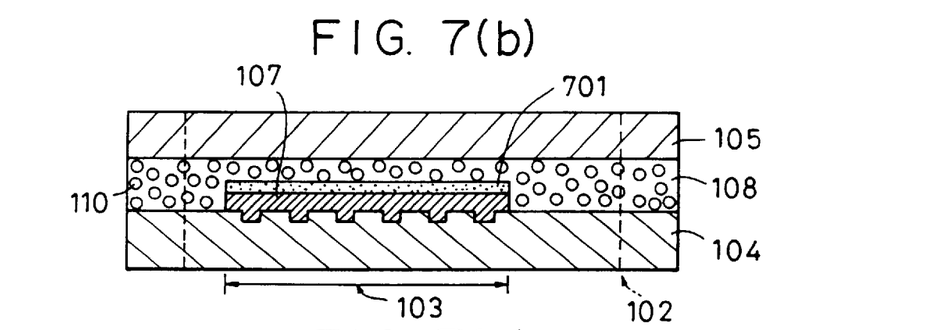
FIG. 7(b) is a slightly enlarged schematic sectional view of the optical card taken along the line 7B—7B of FIG. 7(a)
Figure 7C:
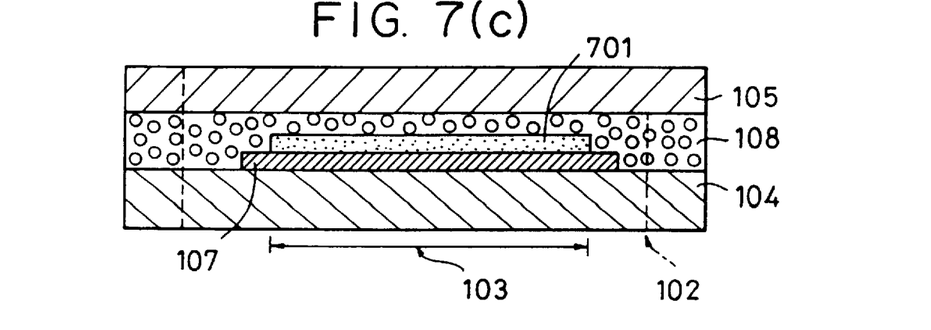
FIG. 7(c) is a slightly reduced schematic sectional view of the optical card taken along the line 7C—7C of FIG. 7(a)

In a preferable structure of a work-sized optical recording medium in an embodiment of in the present invention, an adhesive layer 203 having no solid particles is arranged on the recording layer 107 in the recording area 103 as shown in FIG. 6, or an intermediate layer 701 is provided in such a way that the adhesive layer 108 containing solid particles does not directly contact the recording layer 107 in the recording area 103, as shown in FIG. 7. This makes it possible to record signals uniformly in the recording area. The adhesive agents described above may be used as materials for the adhesive layer 203 and the intermediate layer 701.

In the case of the structure shown in FIG. 6, such a work-sized optical card can be manufactured by applying an adhesive agent which does not contain solid particles in a portion corresponding to the recording area on a recording film formed on a work-sized substrate or laminating an adhesive resin sheet which does not contain solid particles, and applying an adhesive agent which contains solid particles or laminating an adhesive resin sheet in which solid particles are dispersed outside the recording area including the area outside of the cutting position, then laminating a protective substrate, and heating and/or pressurizing them.

Next, a description will be given of a method of cutting an optical recording medium in accordance with the present invention.

Figure 8A:
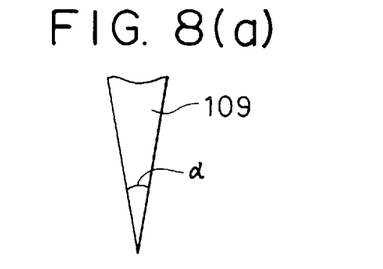
FIG. 8(a) is a schematic sectional view of an embodiment of a double-edged cutting edge in accordance with the present invention.
Figure 8B:
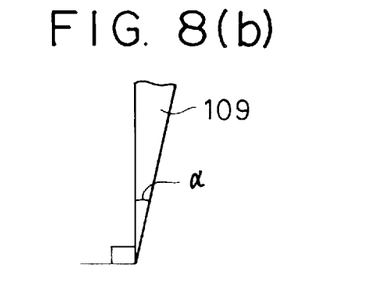
FIG. 8(b) is a schematic sectional view of an embodiment of a single-edged cutting edge in accordance with the present invention.

The cutting edge 109 used in the present invention is not limited to that described above. When a resin substrate is used as the substrate and the protective substrate, a cutting edge made of high speed steel or the like may be used. Regarding the shape thereof, a so-called double-edged cutting edge whose cross section is shaped as shown in FIG. 8(a), or a single-edged cutting edge whose cross section is shaped as shown in FIG. 8(b) may be used. If the angle α of the cutting edge is set at 10° to 40° and more particularly 15° to 30°, the end surface of the cut optical recording medium can be cut nearly at right angles to the horizontal surface. Therefore, it is possible to obtain a recording medium having good appearance and to improve the accuracy of recording/reproduction in the case of the optical card.

The speed at which the cutting edge enters into the optical recording medium should preferably be set at 2 to 50 mm/sec and, more particularly, 5 to 30 mm/sec, in order to prevent the adhesive layer 108 from squeezing out. Further, cutting while this speed is maintained at a constant speed and/or heating the vicinity of the cutting position prior to the cutting of the optical recording medium is preferable to prevent the substrate and/or the protective substrate from cracking and breaking.

If a substrate and a protective substrate formed of resins commonly used for the optical recording media are used, the temperature in the cut portion is set at 80° to 110° C. and, more particularly, 90° to 100° C., though this temperature depends upon materials of the substrate and the protective substrate. The heating time is set at 30 to 180 seconds and, more particularly, 60 to 120 seconds. As a result, it is possible to cut the optical recording medium without causing the adhesive layer to squeeze out and without causing the substrate and/or the protective substrate to crack or break. This process is particularly effective when an acrylic resin having low resistance to impact is used in the substrate.

Figure 9A:
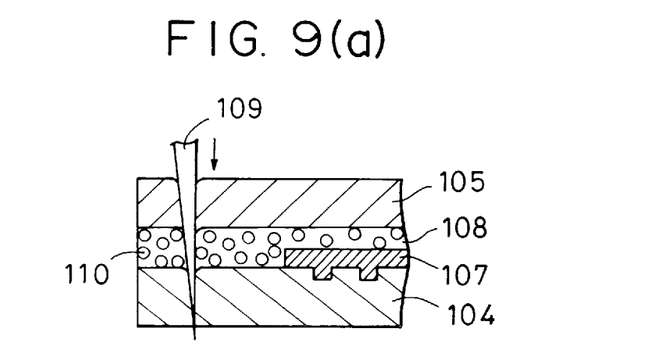
FIG. 9(a) is an illustration of another embodiment of a cutting method using a cutting edge in accordance with the present invention.
Figure 9B:
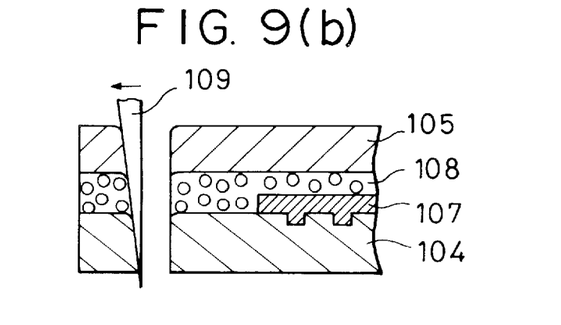
FIG. 9(b) is an illustration of another embodiment of a cutting method using a cutting edge in accordance with the present invention.

In the cutting step, one cycle is terminated when, after the cutting edge is made to enter the optical recording medium along the full thickness thereof as shown in FIG. 9(a), the cutting edge is pulled out from the optical recording medium, however, in the present invention, it is preferable that the cutting edge entering the optical recording medium along the full thickness thereof is moved outwardly as shown in FIG. 9(b) so that the cutting edge does not contact the end surface of the cut optical recording medium. In this manner, it is possible to prevent the members from being separated in the end portion of the optical recording medium.

Figure 10:
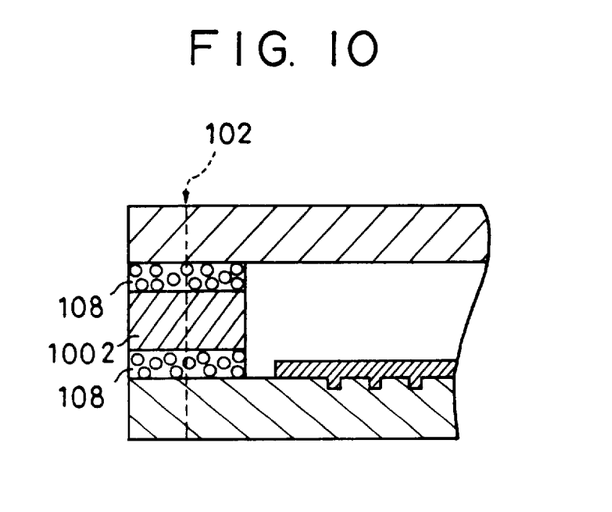
FIG. 10 is a schematic sectional view of an embodiment of an optical recording medium in accordance with the present invention.

Although the above-described embodiment of the present invention is concerned with an optical recording medium in which a recording film is hermetically sealed by the adhesive layer 108, the present invention is not limited to such a structure. For example, it may also be preferably used in an optical recording medium in which a substrate and a protective substrate are bonded to each other with an adhesive layer 1001 and a spacer 108 provided therebetween in an area outside the recording area, as shown in FIG. 10.

There is no need to limit the recording layer 107 of the optical recording medium in accordance with the present invention, and a wide range of materials may be used, for example, low-melting point metallic materials include: Te, Te-Cu, TeO, Cu-Sn, and Cu-N, organic dye materials include: polymethine, pyrylium, cyanine, naphthoquinone, and triphenylmethane. There is also no need to limit the film formation method, and a conventional process may be used. For example, a vacuum film formation process, such as vapor deposition or sputtering, may be used for low-melting point metallic materials. A gravure printing method or a spin coating method may be used for organic dye materials.

The drawbacks associated with the substrate 104 and the protective substrate 105 during optical recording and reproduction should preferably be small. When pregrooves are formed, materials having good moldability are preferable. Examples of preferred materials are: acrylic resin, polycarbonate resin, polyester resin, vinyl resin, polyimide resin, polyacetal resin, polyolefine resin, polyamide resin, and cellulose derivatives.

As described above, according to the present invention, (1) It is possible to prevent the adhesive agent from squeezing out in the cutting step using a cutting edge, and to save the labor for removing adhesive layer which squeezes out as in the prior art, resulting in a reduced cost.

(2) A deformation of the adhesive layer is reduced to prevent a decrease in the bonding strength on the cutting end surface in the cutting step using a cutting edge, and an optical recording medium which does not peel off and has excellent durability can be obtained.

(3) It is possible to prevent the adhesive agent from squeezing out even when the cutting position is heated prior to cutting in order to prevent the substrate and/or the protective substrate from cracking or breaking in the cutting step using a cutting edge, and it is possible to manufacture a high-quality optical recording medium at a low cost.

The present invention will be explained below in more detail with reference to examples.

[EXAMPLE 1]

An optical card having a predetermined size of 85 mm by 54 mm was manufactured by a method described below. Initially, an acrylic resin substrate having a work size (90 mm×100 mm×0.4 mm thick) was prepared. Stripe-shaped track grooves having a length of 80 mm, a width of 3 μm, a pitch of 12 μm, and a depth of 2,700 to 3,000 Å are held within an area. 30 mm long and 80 mm wide on the surface of the substrate.

Next, an organic coloring matter solution is applied by a gravure coating method in an area of the surface of the substrate where the track grooves are formed and dried to form a recording layer having a thickness of 1,000±100Å. The solution in which a polymethine dye represented by the structural formula [I] described below was dissolved into diaetone alcohol, was used as the organic dye solution.

Next, 50% by volume of glass beads (manufactured by Sekisui Chemical Co., Ltd.) were mixed with an ethylene-vinyl acetate hot-melt adhesive agent (product name: Hirodine 7580; Hirodine Kogyo Co., Ltd.) on the side where the recording film of the substrate was formed. A hot-melt dry film, 50 μm thick, was stacked thereon. Then, an acrylic resin protective substrate having a work size (90 mm×100 mm×0.35 thick) was stacked thereon, after which they were thermo-bonded by a heat roller in order to manufacture a work-sized optical card.

Structural formula [I]

Figure 11:
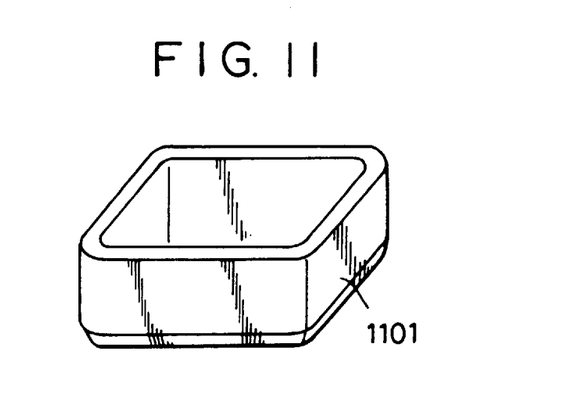
FIG. 11 is a schematic perspective view of a punching edge for use in the embodiment of the present invention.

The work-sized optical card was cut into the predetermined second card so as to include an area formed on a recording layer by using a cutting machine (product name: single puncher CPS type: manufactured by Aisel Co., Ltd.). At this time, a cutting edge which can cut out the predetermined-sized optical card from the work-sized optical card, indicated as reference numeral 1101 in the perspective view of FIG. 11, was used as the cutting edge 109 of the cutting machine. A single-edged cutting edge whose cross section inside the cutting position is at right angles to the horizontal surface as shown in FIG. 8(b) was used. The angle α was set at 20°. The speed at which the cutting edge enters the optical card was set at 15 mm/sec.

As a result, the thickness of the adhesive layer after cutting was not 85% or less than that of the adhesive layer before cutting in the end surface of the adhesive layer, and thus the adhesive layer was not substantially deformed.

The squeeze out of the adhesive layer at the end surface of the optical card thus obtained was evaluated by visual check and touching. The presence and absence of the air layer in the interface, the extent that the air layer enters from the end surface into the inside, and the ratio of the end surface where peeling has occurred to the entire circumference of the card were evaluated as regards the peeled state of the substrate and the protective substrate at the end surface of the optical card. The evaluation was performed on the basis of the criteria described below.

(1) Squeeze out of the adhesive agent
  A: Squeeze out cannot be detected by visual check and touching.
  B: Squeeze out cannot be detected by visual check, but can be detected by touching.
  C: Squeeze out can be detected by visual check.

(2) Peeled state
  A: No peeling off.
  B: Peeling occurred. The squeeze out from the end surface is 0.5 mm or less, and the ratio of the peeled portion to the entire circumference of the card is 10% or less.
  C: Peeling occurred. The squeeze out from the end surface is greater than 0.5 mm and less than or equal to 1 mm, and the ratio of the peeled portion to the entire circumference of the card is 20% or less.
  D: Peeling occurred. The squeeze out from the end surface is greater than 1 mm, and the ratio of the peeled portion to the entire circumference of the card is greater than 20%.

The results of the evaluation of this example are shown in Table 1.

[Comparative Example 1]

An optical card was manufactured in the same way as in Example 1 except that the adhesive layer did not contain glass beads. When the adhesive layer was cut in the same manner as in Example 1, the thickness of the adhesive layer after cutting was 65% of the original thickness. The squeeze out and peeled state of the adhesive layer of the optical card thus obtained were evaluated. The results of the evaluation are shown in Table 1.

[EXAMPLE 2]

An optical card of a work size was manufactured in the same way as in Example 1. Thereafter, the cutting position was heated at 80° C. for two minutes prior to cutting, after which the optical card was cut in the same manner as in Example 1, thus manufacturing an optical card. No substantial deformation of the adhesive layer occurred.

The squeeze out and peeled state of the optical card thus obtained were evaluated. The results of the evaluation are shown in Table 1.

[Comparative Example 2]

An optical card was manufactured in the same way as in Comparative Example 1. Thereafter, the cutting position was heated at 80° C. for two minutes prior to cutting, after which the optical card was cut in the same manner as in Comparative Example 1, thus manufacturing an optical card. A large deformation occurred in the adhesive layer. The squeeze out and peeled state of the adhesive layer of the optical card thus obtained were evaluated. The results of the evaluation are shown in Table 1.

[Comparative Example 3]

Figure 5:
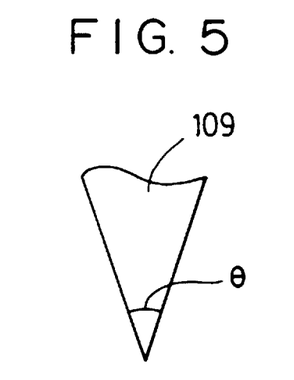
FIG. 5 is an illustration of the cutting edge.

A work-sized optical card was cut in the same way as in Example 1, except that the cutting edge of the cutting apparatus was shaped as shown in FIG. 5 ($\theta=40°$). The thickness of the adhesive layer of the optical card after cutting was 60% of the thickness before cutting, and a deformation occurred in the adhesive layer.

The squeeze out and peeled state of the adhesive layer of the optical card thus obtained were evaluated. The results of the evaluation are shown in Table 1.

TABLE 1

|  | Squeeze out of adhesive agent | Peeled state |
| --- | --- | --- |
| Example 1 | A | A |
| Comparative Example 1 | C | D |
| Example 2 | A | A |
| Comparative Example 2 | C | C |
| Comparative Example 3 | C | C |

[EXAMPLE 3]

A work-sized optical card was manufactured in the same way as in Example 1 except that 40% by volume of $Al_2O_3$ particles having an average particle size of 40 μm were used in place of glass beads.

An optical card was cut by using a cutting machine used in Example 1 under the condition where the speed at which the cutting edge enters was set at 25 mm/sec, thus manufacturing an optical card. No substantial deformation occurred in the adhesive layer.

Next, a total of 100 optical cards were manufactured by repeatedly performing the above operation. The squeeze out and peeled state of the adhesive layer of these optical cards were evaluated in the same manner as in Example 1.

The squeeze out of the adhesive layer was evaluated as "A" for all the cards. The peeled state of the cards was evaluated as "A" for all the cards, but as "B" for 10 cards. However, the end surfaces of 5 optical cards were cracked and broken.

[EXAMPLE 4]

One hundred optical cards were manufactured in the same way as in Example 3 except that the cutting position was heated at 90° C. for one minute before the work-sized optical card was cut. The adhesive layer was not substantially deformed.

When these optical cards were evaluated in the same way as in Example 1, the squeeze out of the adhesive agent of all the cards was evaluated as "A". The peeled state of 6 optical cards was evaluated as "B", and "A" for the rest. No crack or break occurred in the end surfaces of all the optical cards.

[EXAMPLE 5]

One hundred optical cards were manufactured in the same way as in Example 4 except that the work sized optical card was cut by using a cutting apparatus shown in FIG. 9.

When all the optical cards were evaluated, the squeeze out and peeled states of all the cards were evaluated as "A", and no crack or break occurred in the end surface of any of the optical cards.

[EXAMPLE 6]

An optical card was manufactured in the same way as in Example 1 except that a bisphenol A type polycarbonate resin (product name: Panlite L-1250, manufactured by Teijin Chemicals Ltd.) was used as the work-sized substrate and the protective substrate.

No substantial deformation of the adhesive layer was observed in the end surface of the optical card. When this optical card was evaluated in the same way as in Example 1, both the squeeze out and peeled states of the card were evaluated as "A".

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A process for manufacturing an optical recording medium having, in order, a first substrate, a recording film having a recording area, and a protective second substrate, and having a predetermined size, in which the protective second substrate is stacked on the first substrate using a hot-melt type adhesive layer at least outside the recording area of the recording film, said process comprising the step of:

cutting out an optical recording medium of the predetermined size from an optical recording medium of a work size which is larger than the predetermined size, the work-sized optical recording medium comprising a work-sized substrate having the recording film on a surface of the work-sized substrate, and a work-sized protective substrate provided on the work-sized substrate using an adhesive layer at least in an area outside of a recording area that extends both inside and outside of a boundary of the predetermined size, wherein said cutting is performed by forcing a cutting blade, having an angle of 15 degrees to 30 degrees, of a cutting tool completely through a thickness of the work-sized optical recording medium without substantially deforming the adhesive layer positioned at least inside the boundary of the predetermined size, and wherein in said cutting step, a speed at which the cutting blade enters the work-sized optical recording medium is from 2 to 50 mm/sec; and wherein the first and second substrates are made of a polycarbonate resin or an acrylic resin.

2. A process according to claim 1, wherein, in said cutting step, the cutting blade is forced through the medium and the adhesive layer of the work-sized optical recording medium corresponding to a location where the cutting blade is made to enter the work-sized optical recording medium is not compressed to less than 70% of an original thickness of the adhesive layer of the work-sized optical recording medium.

3. A process according to claim 2, wherein, in said cutting step, the speed at which the cutting blade enters the work-sized optical recording medium is from 5 to 30 mm/sec.

4. A process according to claim 1, wherein, in said cutting step, forcing the cutting blade completely through the thickness of the work-sized optical recording medium divides the medium into a product piece and a scrap piece, each of the product piece and the scrap piece having an end surface created by the cutting, and further wherein, after the cutting, the cutting tool is separated from the end surface of the product piece.

5. A process according to claim 1, wherein, in said cutting step, forcing the cutting blade completely through the thickness of the work-sized optical recording medium divides the medium into a product piece and a scrap piece, each of the product piece and the scrap piece having an end surface created by the cutting, and further wherein, after the cutting, the cutting tool is separated from the end surface of the product piece in a direction that is outwardly away from the end surface of the product piece, and then the cutting tool is returned to a predetermined position without re-contacting the end surface of the product piece.

6. A process according to claim 1, wherein, in said cutting step, a thickness of the adhesive layer is not compressed to less than 70% of an original thickness of the adhesive layer before said cutting step.

7. A process according to claim 6, wherein, in said cutting step, the adhesive layer adjacent a position at which the cutting blade is made to enter the work-sized optical recording medium contains solid particles.

8. A process according to claim 7, wherein, in said cutting step, the solid particles comprise at least one material selected from a group consisting of glass, metals, ceramics and resins.

9. A process according to claim 7, wherein, in said cutting step, a particle size of the solid particles is from 0.1 to 100 $\mu$m.

10. A process according to claim 9, wherein, in said cutting step, the particle size of the solid particles is from 0.5 to 50 $\mu$m.

11. A process according to claim 10, wherein, in said cutting step, the particle size of the solid particles is from 20 to 50 $\mu$m.

12. A process according to claim 7, wherein, in said cutting step, a percentage of solid particles within the adhesive layer is from 20 to 70% in volume.

13. A process according to claim 12, wherein, in said cutting step, the percentage of solid particles within the adhesive layer is from 40 to 60% in volume.

14. A process for manufacturing an optical recording medium having, in order, a first substrate, a recording film having a recording area and a protective second substrate, and having a predetermined size, in which the protective second substrate is stacked on the first substrate using a hot-melt type adhesive layer at least outside the recording area of the recording film, said process comprising the step of:

cutting out an optical recording medium of the predetermined size, by using a cutting blade, having an angle of 15 degrees to 30 degrees, of a cutting tool, from an optical recording medium having a work size larger than the predetermined size, the work-sized optical recording medium comprising a work-sized substrate having the recording film provided on a surface of the work-sized substrate, and a work-sized protective substrate provided on the work-sized substrate using an adhesive layer at least in an area outside the recording area that extends both inside and outside a boundary of the predetermined size, wherein the adhesive layer positioned at least adjacent a position where the cutting blade is made to enter the optical recording medium contains solid particles, and wherein said cutting is performed by forcing the cutting blade of the cutting tool through a thickness of the work-sized optical recording medium without substantially deforming the adhesive layer, and wherein in said cutting step, a speed at which the cutting blade enters the work-sized optical recording medium is from 2 to 50 mm/sec; and wherein the first and second substrates are made of a polycarbonate resin or an acrylic resin.

15. A process according to claim 14, wherein, in said cutting step, in the work-sized optical recording medium, a spacer is disposed between the work-sized protective substrate and the work-sized substrate having the recording film.

16. A process according to claim 14, wherein, in said cutting step, in the work-sized optical recording medium, the adhesive layer extends into the recording area.

17. A process according to claim 16, wherein, in said cutting step, the adhesive layer does not contain solid particles.

18. A process according to claim 14, wherein, in said cutting step, at least one of the first substrate and the protective second substrate is made of an acrylic resin.

19. A process according to claim 14, wherein, in said cutting step, at least one of the first substrate and the protective second substrate is made of a polycarbonate resin.

20. A process according to claim 14, wherein, in said cutting step, the speed at which the cutting blade enters the work-sized optical recording medium is from 5 to 30 mm/sec.

21. A process according to claim 14, wherein, in said cutting step, the solid particles comprise at least one material selected from a group consisting of glass, metals, ceramics and resins.

22. A process according to claim 14, wherein, in said cutting step, a particle size of the solid particles is from 0.1 to 100 $\mu$m.

23. A process according to claim 22, wherein, in said cutting step, the particle size of the solid particles is from 0.5 to 50 $\mu$m.

24. A process according to claim 23, wherein, in said cutting step, the particle size of the solid particles is from 20 to 50 $\mu$m.

25. A process according to claim 14, wherein, in said cutting step, a percentage of solid particles within the adhesive layer is from 20 to 70% by volume.

26. A process according to claim 25, wherein, in said cutting step, the percentage of solid particles within the adhesive layer is from 40 to 60% by volume.

27. A process according to claim 14, wherein, in said cutting step, forcing the cutting blade completely through the thickness of the work-sized optical recording medium divides the medium into a product piece and a scrap piece, each of the product piece and the scrap piece having an end surface created by the cutting, and further wherein, after the cutting, the cutting tool is separated from the end surface of the product piece.

28. A process according to claim 14, wherein, in said cutting step, forcing the cutting blade completely through the thickness of the work-sized optical recording medium divides the medium into a product piece and a scrap piece, each of the product piece and the scrap piece having an end surface created by the cutting, and further wherein, after the cutting, the cutting tool is separated from the end surface of the product piece in a direction that is outwardly away from the end surface of the product piece, and then the cutting tool is returned to a predetermined position without re-contacting the end surface of the product piece.

29. A process according to claim 14, wherein, in said cutting step, the solid particles are contained in the adhesive layer, positioned adjacent a position at which the cutting blade is made to enter the work-sized optical recording medium.

30. A process according to claim 14, wherein, in said cutting step, a thickness of the adhesive layer is not compressed to less than 70% of an original thickness of the adhesive layer before said cutting step.

31. A process according to claim 30, wherein, in said cutting step, the thickness of the adhesive layer is not compressed to less than 80% of the original thickness of the adhesive layer before said cutting step.

* * * * *

UNITED STATES PATENT AND TRADEMARK OFFICE
CERTIFICATE OF CORRECTION

PATENT NO. : 5,806,388
DATED : September 15, 1998
INVENTOR(S) : Hiroyuki Imataki It is certified that error appears in the above-identified patent and that said Letters Patent is hereby corrected as shown below:

Column 11, line 15, "Claim 2" should be --Claim 1--.
Column 12, line 45, change "14" to --16--.

Signed and Sealed this

Second Day of March, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,806,388

DATED : September 15, 1998

INVENTOR(S): HIROYUKI IMATAKI

It is certified that error appears in the above-identified patent and that said Letters Patent is hereby corrected as shown below:

On the title page,
Item [56] U.S. PATENT DOCUMENTS:

"Imataka et al." should read --Imatake et al.--;
"5,173,391 12/1992 Hiraoka et al." should read
--5,173,391 12/1992 Hiraoko et al.--; and Item [57] Abstract:

Line 4, "substrate" (first occurrence) should read
--substrate,--.

COLUMN 2:

Line 28, "substrate" should read --substrate,--; and
Line 32, "out" should read --out,-- and "edge" should read --edge,--.

COLUMN 5:

Line 46, "in" should be deleted.

UNITED STATES PATENT AND TRADEMARK OFFICE
CERTIFICATE OF CORRECTION

PATENT NO. : 5,806,388

DATED : September 15, 1998

INVENTOR(S): HIROYUKI IMATAKI

It is certified that error appears in the above-identified patent and that said Letters Patent is hereby corrected as shown below:

COLUMN 6:

Line 9, "cross section" should read --cross-section--;
   Line 10, "cross section" should read --cross-section--;
   Line 28, "the" (first occurrence) should be deleted; and
   Line 59, "1001" should read --108-- and "108" should read --1002--.

COLUMN 8:

Line 19, "cross section" should read --cross-section--.

Signed and Sealed this

Twenty-third Day of November, 1999

Attest:

Q. TODD DICKINSON

*Attesting Officer*         *Acting Commissioner of Patents and Trademarks*